US010607154B2

United States Patent
Sullivan et al.

(10) Patent No.: US 10,607,154 B2
(45) Date of Patent: Mar. 31, 2020

(54) SOCIOECONOMIC GROUP CLASSIFICATION BASED ON USER FEATURES

(71) Applicant: Facebook, Inc., Menlo Park, CA (US)

(72) Inventors: Brendan M. Sullivan, Harvard, MA (US); Gopikrishna Karthikeyan, London (GB); Zuli Liu, Sunnyvale, CA (US); Wouter Lode Paul Massa, Seattle, WA (US); Mahima Gupta, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 800 days.

(21) Appl. No.: 15/221,587

(22) Filed: Jul. 27, 2016

(65) Prior Publication Data

US 2018/0032883 A1    Feb. 1, 2018

(51) Int. Cl.
*G06N 20/00*      (2019.01)
*G06Q 30/02*      (2012.01)

(52) U.S. Cl.
CPC ......... *G06N 20/00* (2019.01); *G06Q 30/0201* (2013.01); *G06Q 30/0202* (2013.01); *G06Q 30/0269* (2013.01)

(58) Field of Classification Search
CPC ...... G06N 20/00; G06Q 30/02; G06Q 40/025; G06F 17/30
See application file for complete search history.

(56) References Cited

U.S. PATENT DOCUMENTS

| 7,937,336 B1 * | 5/2011 | Maynard-Zhang ........................ H04L 29/1299 706/12 |
| 10,542,101 B2 * | 1/2020 | Kappler ................. H04L 67/10 |
| 2008/0082417 A1 * | 4/2008 | Publicover ............. G06Q 30/02 705/14.23 |
| 2012/0089605 A1 * | 4/2012 | Bangalore ......... G06F 16/90332 707/737 |

(Continued)

OTHER PUBLICATIONS

Preotiuc-Pietro et al., "Studying User Income through Language Behaviour and Affect in Social Media", Sep. 22, 2015, PLOS One, pp. 1-17 (Year: 2015).*

(Continued)

*Primary Examiner* — Hien D Khuu
(74) *Attorney, Agent, or Firm* — Fenwick & West LLP (57) ABSTRACT

An online system uses classifiers to predict the socioeconomic group of users of the online system. The classifiers use models that are trained using features based on global information about a population of users such as demographic information, device ownership, internet usage, household data, and socioeconomic status. The global information can be aggregated from market research questionnaires and provided to the online system. The classifiers input information about a user and output a probability that the user belongs to a given socioeconomic group. The input information is based on a user profile on the online system associated with the user as well as actions performed by the user on the online system. Thus, the online system can predict the user's socioeconomic group without using the (Continued)

user's income information. The online system can generate content for presentation to the user based on the predicted socioeconomic group.

19 Claims, 6 Drawing Sheets

(56) References Cited

U.S. PATENT DOCUMENTS

| | | | | |
|---|---|---|---|---|
| 2014/0040170 A1* | 2/2014 | Zheng | ............... | H04L 63/1408 706/12 |
| 2014/0149233 A1* | 5/2014 | Dai | ............... | G06Q 30/0277 705/14.73 |
| 2015/0363875 A1* | 12/2015 | Guerry | ............... | G06Q 40/025 705/38 |
| 2016/0078485 A1* | 3/2016 | Shim | ............... | G06Q 30/0267 705/14.64 |
| 2016/0253735 A1* | 9/2016 | Scudillo | ............... | G06Q 30/06 705/14.58 |
| 2018/0260857 A1* | 9/2018 | Kar | ............... | G06Q 30/0271 |

OTHER PUBLICATIONS

Gebru et al. "Using deep learning and Google Street View to estimate the demographic makeup of neighborhoods across the United States", Dec. 2017, PNAS, pp. 13108-13113. (Year: 2017).*

* cited by examiner

SOCIOECONOMIC GROUP CLASSIFICATION BASED ON USER FEATURES

BACKGROUND

1. Field of Art

This description generally relates to online systems, and particularly to predicting the socioeconomic groups of users of online systems.

2. Description of the Related Art

An online system, such as a social networking system, allows its users to connect to and to communicate with other users of the online system. Users may create user profiles on the online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for third parties to increase awareness about products or services to online system users.

Users of online systems may have different interests in products and services based on their particular socioeconomic groups. Generally, a user's socioeconomic group is correlated to the user's income. For example, a user who has an income in a first income range may belong to the working class. Another user who has an income in a second income range, higher compared to the first income range, may belong to the middle class. Further, a third income range may be associated with the upper class. Online systems often do not have information about the income of users, for example, because the users are typically not inclined to share income information, which may be sensitive information, on online systems.

SUMMARY

An online system uses classifiers to predict the socioeconomic group of users of the online system. The classifiers use models that are trained using features based on global information about a population of users such as demographic information, device ownership, internet usage, household data, and socioeconomic status. The global information can be aggregated from market research questionnaires and provided to the online system. The classifiers input information about a user and outputs a probability that the user belongs to a given socioeconomic group. The input information is based on a user profile on the online system associated with the user as well as actions performed by the user on the online system. Thus, the online system can predict the user's socioeconomic group without using the user's income information.

In some embodiments, the online system generates content for presentation to the user based on the predicted socioeconomic group. The content can include sponsored content provided by a third party to the online system. For example, the third party is an entity that offers a product or service and wants to raise awareness of the product or service to target users of the online system belonging to a particular socioeconomic group. Thus, by predicting the socioeconomic groups of users, the online system is able to help the third party present sponsored content to the target users. Third parties are able to effectively promote their products or services, and the online system can provide a more engaging user experience to users by generating content that are more likely to interest users based on their predicted socioeconomic group.

According to one embodiment, a method begins with receiving user information about a target user of an online system. The user information describes a user profile on the online system associated with the target user and describes actions performed by the target user on the online system. Next, the online system retrieves socioeconomic information describing a set of socioeconomic groups. The online system also retrieves global information describing a population of users of the online system, where each user is associated with one of the socioeconomic groups. For each of the users, features are identified describing demographic data of the user, goods owned by the user, and the user's socioeconomic group based on the global information. The online system trains models used by classifiers using the identified features. Each classifier is associated with one of the socioeconomic groups and determines a probability that the target user belongs to the socioeconomic group. The online system predicts a socioeconomic group of the target user using the classifiers and the user information.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
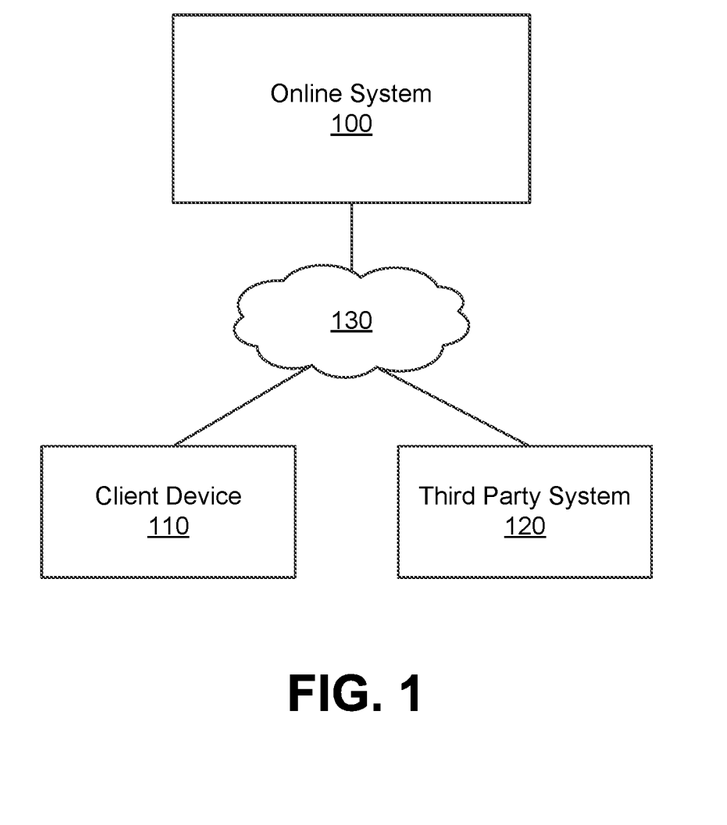
FIG. 1 is a diagram of a system environment for predicting socioeconomic groups according to one embodiment.
Figure 2:
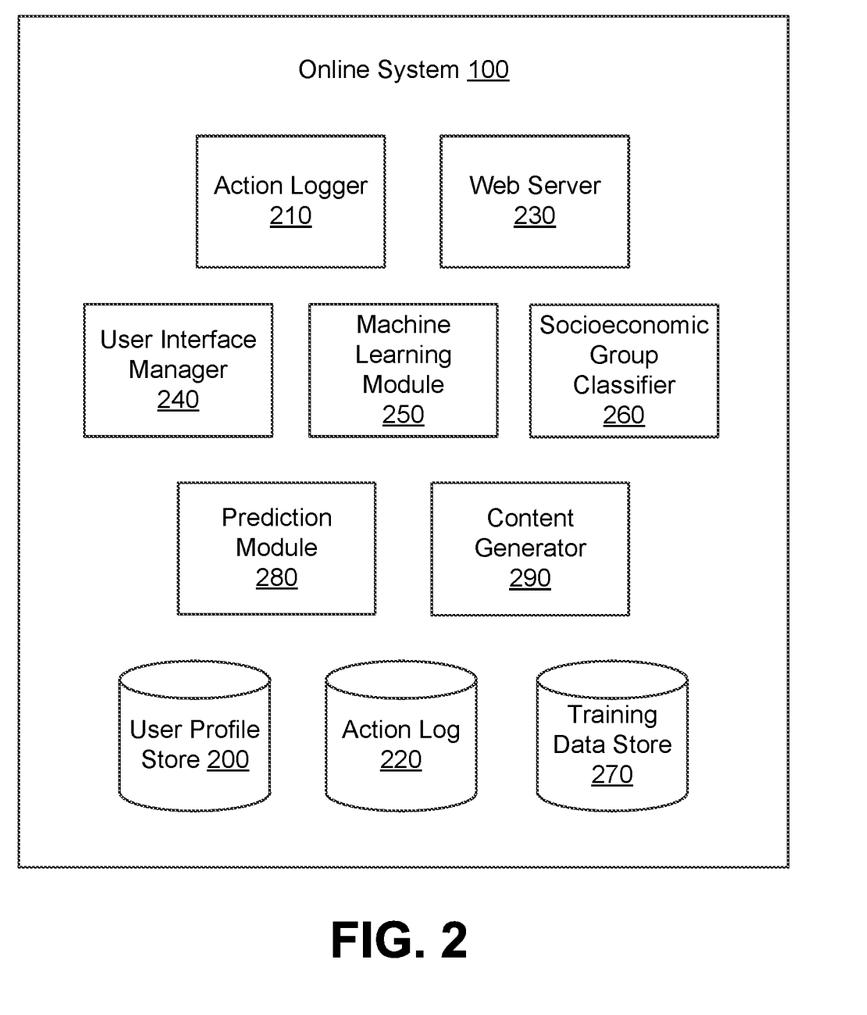
FIG. 2 is a block diagram of a system architecture of an online system for predicting socioeconomic groups according to one embodiment.
Figure 3:
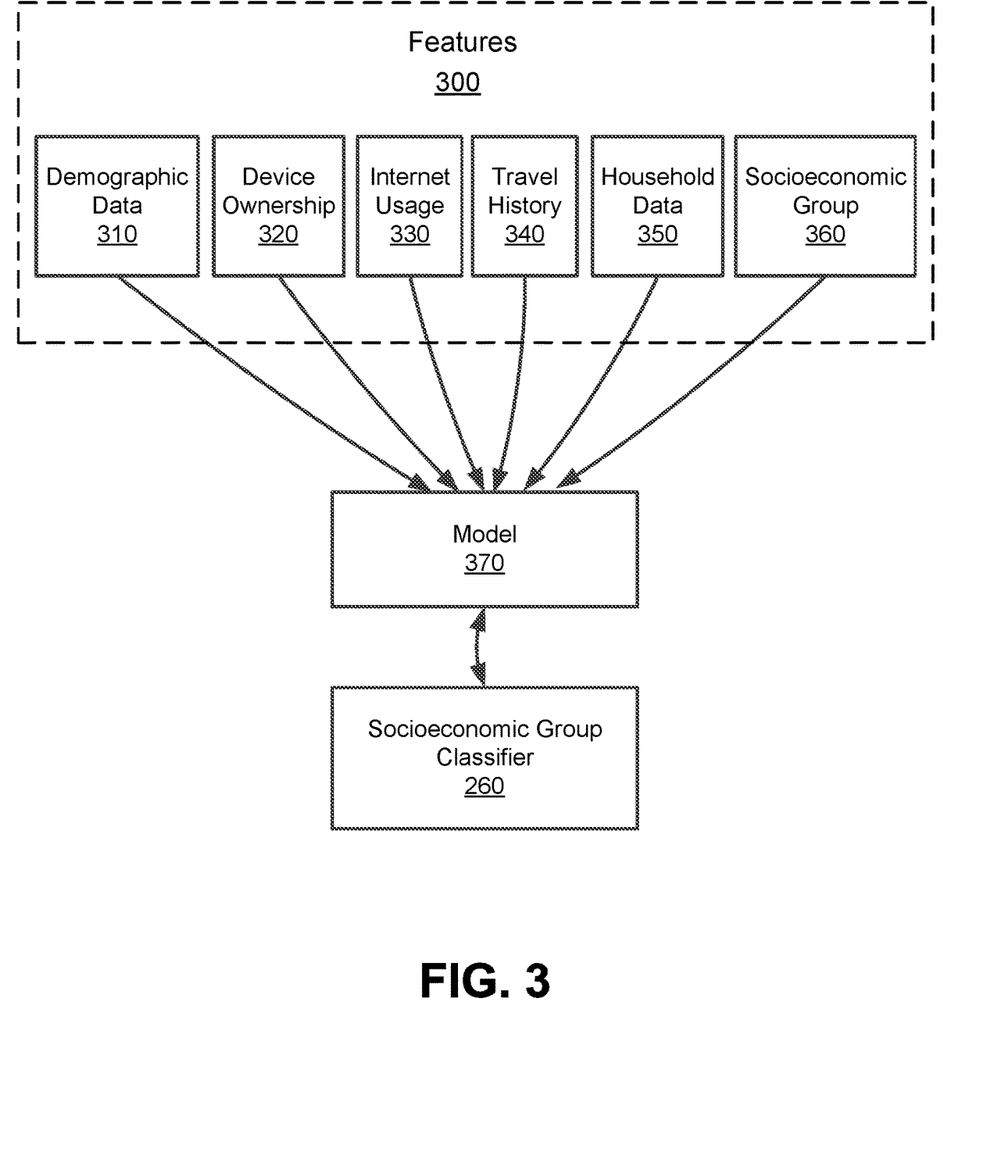
FIG. 3 is a data flow diagram of training a model used by the socioeconomic group classifier according to one embodiment.
Figure 4:
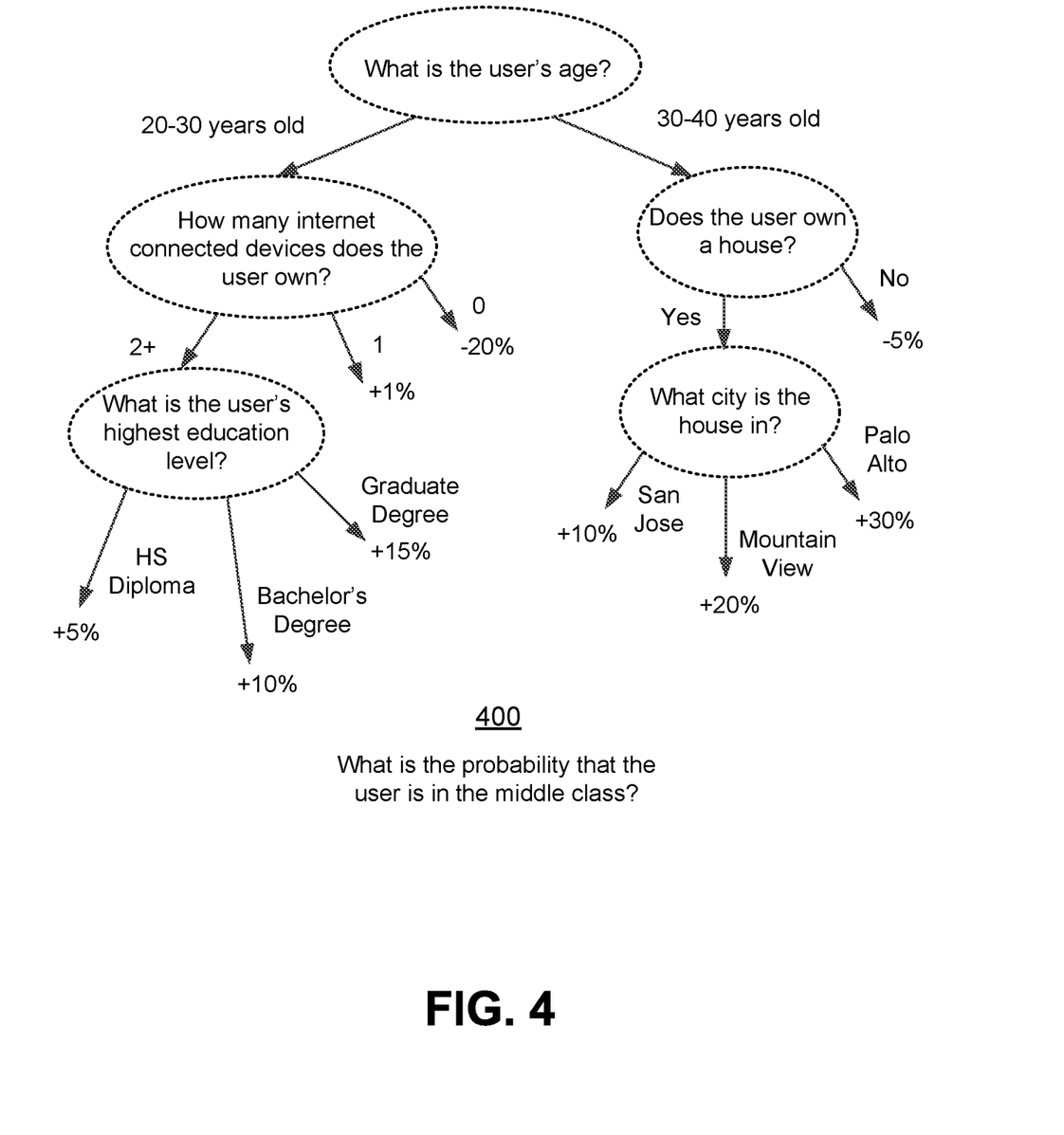
FIG. 4 is a decision tree model for predicting socioeconomic groups according to one embodiment.
Figure 5A:
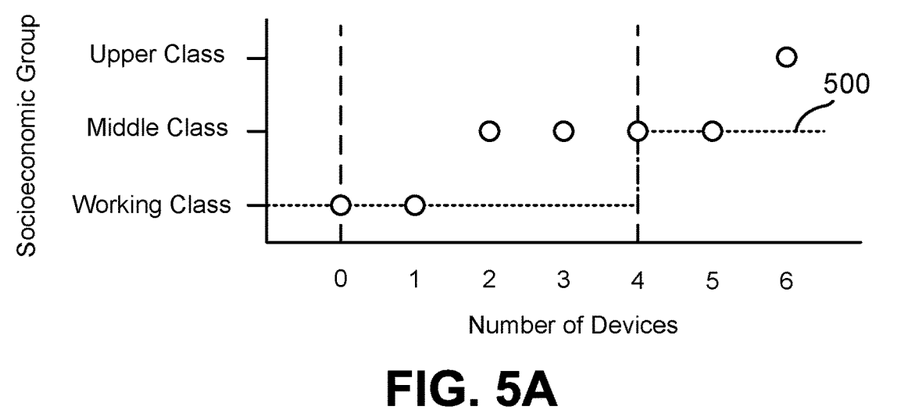
FIG. 5A is a graph of a first step function model for predicting socioeconomic groups with training loss according to one embodiment.
Figure 5B:
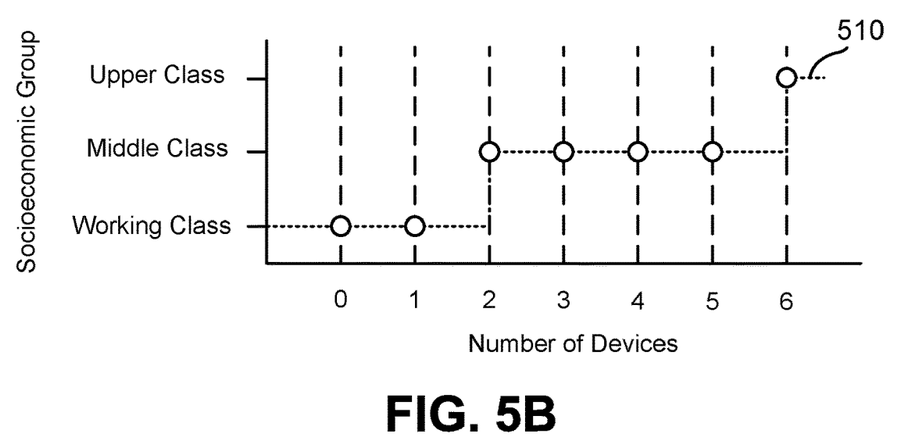
FIG. 5B is a graph of a second step function model for predicting socioeconomic groups with high complexity according to one embodiment.
Figure 5C:
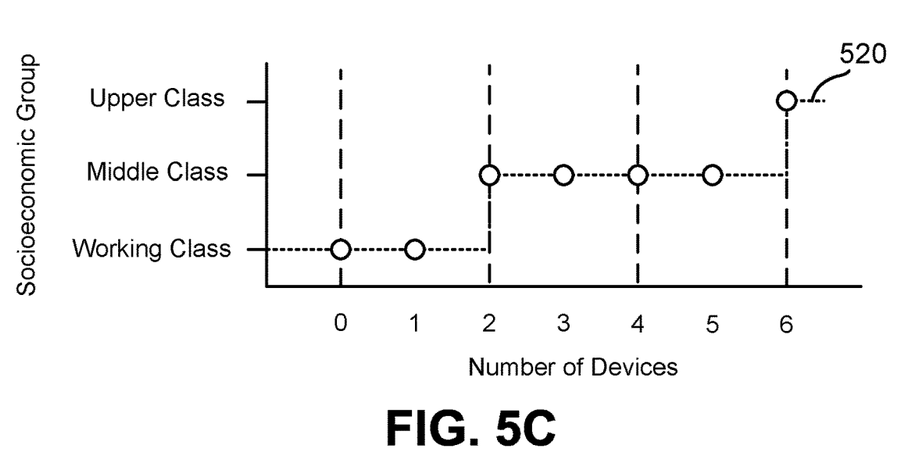
FIG. 5C is a graph of a third step function model for predicting socioeconomic groups according to one embodiment.
Figure 6:
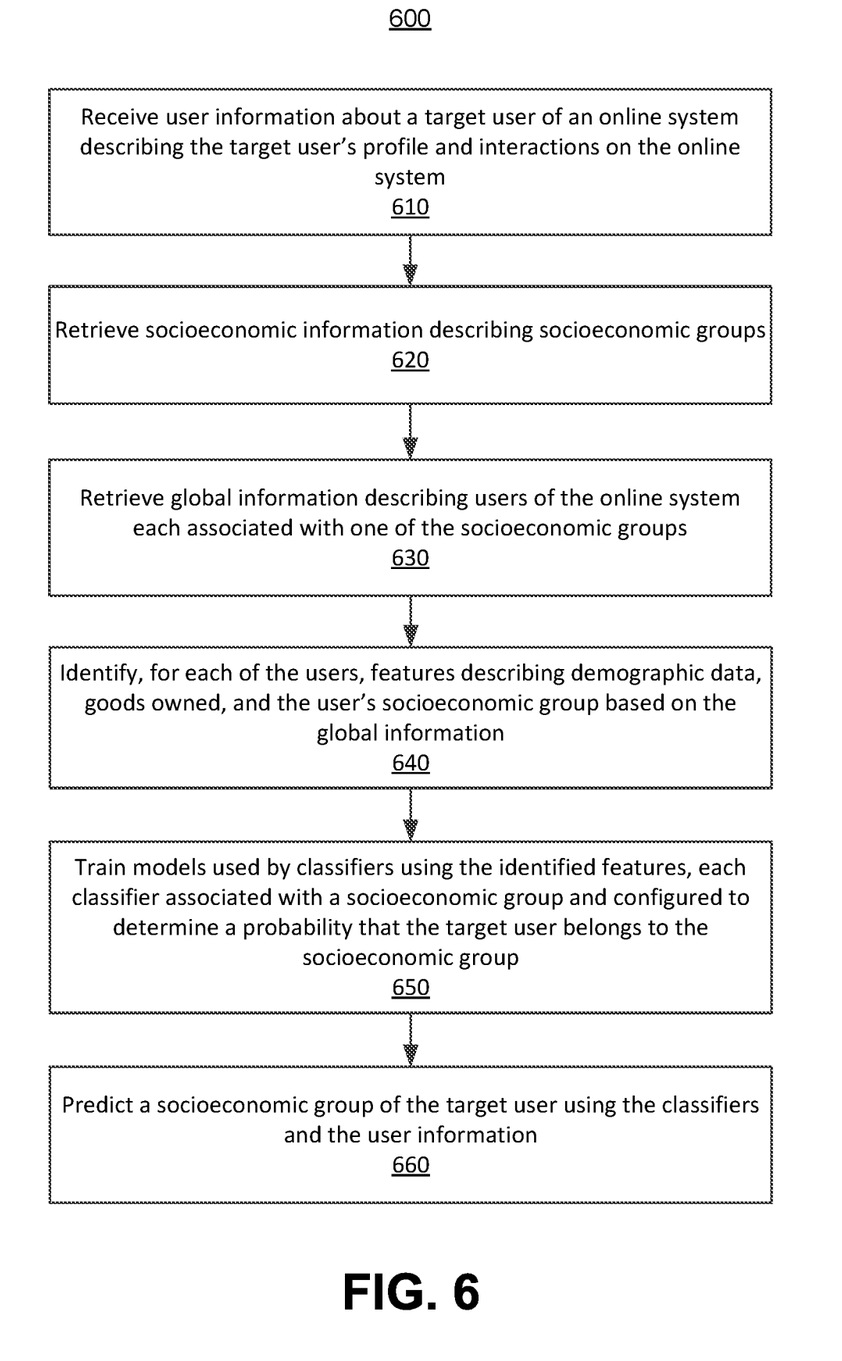
FIG. 6 is a flowchart illustrating a process for predicting socioeconomic groups according to one embodiment.

Particular embodiments as described herein relate to an online system and related systems that integrate information describing user profiles and user actions, data structures that represent the information, and methods to determine socioeconomic groups of users of the online system. FIG. 1 and FIG. 2 show a high level system overview for the described embodiments, including various modules, such as a classifier to predict socioeconomic groups of users. FIG. 3 illustrates features used to train models used by the classifier, FIG. 4 shows an example decision tree model, and FIG. 5A-C shows step function models used to generate the classifier. FIG. 6 shows a method of using the classifiers to predict socioeconomic groups of users.

I. System Overview

Figure (FIG. 1 is a diagram of a system environment for predicting socioeconomic groups according to one embodiment. The system architecture includes an online system 100, a client device 110, and a third party system 120 connected to each other over a network 130. In other embodiments, different and/or additional entities can be included in the system architecture. In some embodiments, the online system 100 is a social networking system.

The online system 100 includes a computing environment that allows users of the online system 100 to communicate or otherwise interact with each other and access content. The online system 100 stores information about the users, for example, user profile information and information about actions performed by users on the online system 100. Based on the stored information, the online system 100 can predict a socioeconomic group of a given user. Examples of socioeconomic groups include working class, middle class, upper class, etc. Typically, a user's socioeconomic group is based on an income of the user. The online system 100 can determine the probability that a user belongs to a socioeconomic group without necessarily using the income of the user.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 130. In one embodiment, a client device 110 executes an application allowing a user of the client device 110 to interact with the online system 100. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

In one embodiment, a third party system 120 is an application provider communicating information describing applications for execution by a client device 110 or communicating data to client devices 110 for use by an application executing on the client device 110. In other embodiments, a third party system 120 provides content or other information for presentation via a client device 110. For example, the third party system 120 provides a third party website that communicates information to the online system 100, such as sponsored content or information about an application provided by the third party system 120. The sponsored content may be created by the entity that owns the third party system 120. Such an entity may be a company offering a product, service, or message that the company wishes to promote.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

FIG. 2 is a block diagram of a system architecture of the online system 100 for predicting socioeconomic groups according to one embodiment. The online system 100 includes a user profile store 200, action logger 210, action log 220, web server 230, user interface manager 240, machine learning module 250, socioeconomic group classifier 260, training data store 270, prediction module 280, and content generator 290. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with each user of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 100 displayed in an image. A user profile in the user profile store 200 may also maintain references to actions by the corresponding user performed on the online system 100. The user profile store 200 further stores data describing one or more relationships between different users and allows users to specify their relationships with other users. For example, these user-defined relationships allow users to generate relationships with other users that parallel the user's real-life relationships, such as friends, co-workers, partners, and the like.

The user profile store 200 can store user profiles associated with individuals, as well as user profiles associated with entities such as businesses or organizations, e.g., that own a third party system 120. This allows an entity to establish a presence on the online system 100 for connecting and exchanging content with other users of the online system 100. The entity may post information about itself, about its products, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track user actions on the online system 100, as well as actions on third party systems 120 that communicate information to the online system 100. Users may interact with various objects on the online system 100, and the action logger 210 stores information describing these interactions in the action log 220. Examples of interactions with objects include: commenting on posts, sharing links, and checking-in to physical locations via a mobile device, accessing content items, and any other interactions. Additional examples of interactions with objects on the online system 100 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored content on the online system 100 as well as with other applications operating on the online system 100. In some embodiments, data from the action log 220 is used to infer interests or preferences of a user, augmenting the interests included in the user's user profile and allowing a more complete understanding of user preferences. The action log 220 can record information about client devices 110 that a user uses to interact with the online system 100. For example, the action log 220 records whether the user used a laptop computer or smartphone client device to interact with the online system 100. Further, the action log 220 may include information about the types of client devices 110, e.g., smartphone running an IOS® or ANDROID™ operating system.

The action log 220 may also store user actions taken on a third party system 120, such as an external website, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 220 can record information about actions that users perform on a third party system 120 including webpage viewing histories, sponsored content that were engaged, purchases made, and other patterns from shopping and buying.

The web server 230 links the online system 100 via the network 130 to the one or more client devices 110. The web server 230 serves web pages, as well as other web-related content, such as JAVA®, FLASH®, XML and so forth. The web server 230 may receive and route messages between the online system 100 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 200. Additionally, the web server 230 may provide application programming interface (API) functionality to send data directly to native client device operating systems, such as IOS®, ANDROID™, WEBOS® or RIM®.

The user interface manager 240 generates graphical user interfaces presenting information from the online system 100. For example, the graphical user interfaces display content items, e.g., news feed stories, brand pages, sponsored content, etc., on client devices 110 of users of the online system 100. The content items may be based on information from the user profile store 200 or the action log 220, or based on a user's predicted socioeconomic group. The user may provide information to the online system 100 via the user interface manager 240, e.g., interactions performed by users with content items on the online system 100. Similarly, the third party system 120 may provide information to the online system 100 via the user interface manager 240, e.g., sponsored content or information about a target socioeconomic group of users.

The machine learning module 250 uses machine learning techniques to train one or more models, e.g., decision tree models or step function models. The socioeconomic group classifier 260 (further described with reference to FIGS. 3-5 in section II. Classifiers) uses the trained models to classify users into socioeconomic groups. In one embodiment, the socioeconomic group classifier 260 takes a socioeconomic group and input information about a given user of the online system 100. Based on the input information and the trained models, the socioeconomic group classifier 260 determines a probability that the given user belongs to the socioeconomic group.

In other embodiments, the online system 100 includes multiple socioeconomic group classifiers 260 each associated with a different socioeconomic group. For example, the online system 100 includes three socioeconomic group classifiers 260 each associated with one of: working class, middle class, and upper class. In this example, each socioeconomic group classifier 260 determines a probability that a user belongs to the corresponding socioeconomic group. The socioeconomic group classifiers 260 do not necessarily take a socioeconomic group as an input. Further, the online system 100 can include multiple socioeconomic group classifiers 260 each associated with a different geographical region, e.g., a country such as the United States, China, India, or England. Each socioeconomic group classifier 260 may use a different model trained by the machine learning module 250 using features specific to the corresponding geographical region. Socioeconomic groups of users of the online system 100 may differ based on the geographical region. For instance, behaviors (e.g., products purchased or internet usage) of a typical middle class user in the United States are different than behaviors of a typical middle class user in China. Thus, categorizing socioeconomic group classifiers 260 by geographic region can provide additional granularity in probabilities for a user's predicted socioeconomic group.

The machine learning module 250 trains the one or more models using features based on training data from the training data store 270. The machine learning module 250 can periodically re-train the models using features based on updated training data. Example features (further described with reference to FIG. 3) include the number of internet connected devices owned by a user or the highest level of education attained by a user. In some embodiments, the training data includes predetermined information about a population of users of the online system 100 (or individuals in general), e.g., each associated with a socioeconomic group, provided to the online system 100. For example, the training data includes information from user responses to a market research or focus group questionnaire, which may be categorized based on geographical region. The questionnaire includes questions such as "what home appliances do you own?," "how many internet connected devices do you own?," or "what is your highest level of education?" The corresponding training data includes aggregate responses to the questions from a population of users of various socioeconomic groups. For instance, based on user responses to the question "how many internet connected devices do you own?," the average number of internet connected devices owned by users belonging to the middle class is 2.2 and the average number of internet connected devices owned by users belonging to the upper class is 4.2. Thus, the questionnaire may be evaluated based on a different rubric depending on the geographical region.

The training data store 270 can include (e.g., in addition to the training data and features previously described) baseline information for probability distributions of socioeconomic groups based on a particular geographic region. For example, the baseline information indicates that, for a population of users in the United States, 50% of the users belong to the working class, 40% of users belong to the middle class, and 10% of users belong to the upper class. Typically, the baseline information varies among different geographic regions. Thus, organizing the baseline information by geographic region is likely to provide more accurate distributions of probabilities of users in each socioeconomic group. In some embodiments, the baseline information is further organized based on other types of information such as demographics or a particular city within a geographic region. For example, an urban city has a greater percentage of middle class users than a rural town. In some embodiments, the training data store 270 retrieves information from a global database of training data accessible to the online system 100 via the network 130.

The prediction module 280 predicts a socioeconomic group of a user of the online system 100 based on one or more socioeconomic group classifiers 260. In an example use case, the online system 100 includes three socioeconomic group classifiers 260 each associated with one of: working class, middle class, and upper class. For a given user, the working class socioeconomic group classifier outputs a probability of 20%, the middle class socioeconomic group classifier outputs a probability of 40%, and the upper class socioeconomic group classifier outputs a probability of 10%. Note that the sum of the probabilities output by the socioeconomic group classifiers 260 does not necessarily equal 100%, for example, because information (e.g., user profile information such as demographics or user actions such as product purchases) associated with the given user does not correlate to information of a typical user of each available socioeconomic group. Thus, the sum of the probabilities is likely to be lower than 100% in this case. Since 40% (corresponding to the middle class socioeconomic group classifier) is the greatest probability among the three output probabilities, the prediction module 280 predicts that the given user belongs to the middle class socioeconomic group. The prediction module 280 can resolve ties, e.g., when two or more of the output probabilities are equal, based on a tiebreaker. For example, the tiebreaker weighs one or more features more heavily. In particular, the prediction module 280 may weigh the number of internet connected devices owned by the given user more heavily than the highest level of education attained by the given user to select one socioeconomic group over another socioeconomic group.

The prediction module 280 can also use confidence scores to predict a socioeconomic group of a user. Following in the same example use case described above, the working class socioeconomic group classifier determines a confidence score of 90% associated with the probability of 20%, the middle class socioeconomic group classifier determines a confidence score of 95% associated with the probability of 40%, and the upper class socioeconomic group classifier determines a confidence score of 80% associated with the probability of 10%. The prediction module 280 may only consider probabilities with an associated confidence score greater than a threshold value, e.g., 90%. In other embodiments, the confidence score is the same as the probability (e.g., 10% for the upper class socioeconomic group classifier described above), and the prediction module 280 may only consider probabilities greater than a threshold value. The prediction module 280 can adjust the threshold value, e.g., based on the training data. In particular, if there is less training data available, then the prediction module 280 can decrease the threshold value because the prediction module 280 may be less confident in the predicted socioeconomic groups. On the other hand, if there is a large amount of training data available, then the prediction module 280 can increase the threshold value.

The content generator 290 generates content items for presentation to users of the online system 100. The content generator 290 can analyze information stored in the user profile store 200 or action log 220 to identify information useful for generating content items. The content generator 290 can also obtain information from other modules, for example, from the prediction module 280 or other run time modules that implement functionality for performing different types of actions. For example, if a user uploads an image to the online system 100, the module executing the code for uploading the image informs the content generator 290 of the action so that the content generator 290 can generate a content item describing the action. In another example use case, the content generator 290 receives, from the prediction module 280, a predicted socioeconomic group of a user. Based on the predicted socioeconomic group, the content generator 290 generates content items customized for the user. For example, a content item includes sponsored content describing a product or service that the user is likely to be interested in or purchase based on the predicted socioeconomic group of the user. Further, the content generator 290 can generate content items based on information provided by a third party system 120, e.g., the third party system 120 provides sponsored content.

II. Classifiers

FIG. 3 is a data flow diagram of training a model 370 used by the socioeconomic group classifier 260 according to one embodiment. The machine learning module 250 retrieves training data from the training data store 270 and extracts features 300 from the training data. The machine learning module 250 trains the model 370 (e.g., a decision tree model or a step function model) using the features 300. The training data includes information about a population of users each belonging to a socioeconomic group. The extracted features 300 describe, e.g., demographic data 310, device ownership 320, internet usage 330, travel history 340, household data 350, and/or a socioeconomic group 360 of one or more users of the population of users. Demographic data 310 includes, e.g., age, gender, ethnicity, geographical region, education level, etc. Device ownership 320 includes, e.g., the number of internet connected devices owned, type of smartphone owned, number of televisions owned, etc. Internet usage 330 includes, e.g., average number of hours spent using the internet per day, internet connection speed, internet usage based on times of day (e.g., morning, afternoon, night), usage of online systems such as interactions with a social networking system, etc. Travel history 340 includes, e.g., commute time or distance from household to work office, mode of transportation to work office, information about personal or business flights, travel destinations, etc. Household data 350 includes, e.g., quantity or types of household appliances—such as air conditioning units, refrigerators, or laundry machines—owned, vehicles owned, size of house in square feet, information about other users in the same household, etc. Socioeconomic group 360 indicates a socioeconomic group from a set of socioeconomic groups used by the online system 100, e.g., working class, middle class, and upper class socioeconomic groups. In other embodiments, the machine learning module 250 uses additional, fewer, or different types of features 300.

In one embodiment, the input received by the socioeconomic group classifier 260 includes demographic data, device ownership, internet usage, travel history, household data, and a socioeconomic group of a user. Based on the input and using the model 370, the socioeconomic group classifier 260 generates a probability that the user belongs to the socioeconomic group. The socioeconomic group classifier 260 can also generate a confidence score, e.g., 80%, 90%, 95%, etc., of the probability. In some embodiments, the socioeconomic group classifier 260 does not necessarily need to input each of the inputs shown in FIG. 3. For example, the socioeconomic group classifier 260 inputs only demographic data, device ownership, and a socioeconomic group of a user. The accuracy of the probability may be based on the number or quality of inputs to the socioeconomic group classifier 260. In particular, increasing the number of inputs to the socioeconomic group classifier 260 may likely improve a confidence score of a probability. For example, a probability generated based on two inputs has a confidence score of 90%, while an output generated based on five inputs has a confidence score of 95%.

FIG. 4 is a decision tree model 400 for predicting socioeconomic groups according to one embodiment. The machine learning module 250 can generate the decision tree model 400 for the socioeconomic group classifier 260 to use to determine a probability that a user belongs to a given socioeconomic group. In the example shown in FIG. 4, the socioeconomic group classifier 260 uses the decision tree model 400 to generate a probability that the user is in the middle class. The prediction module 280 retrieves baseline information from the training data store 270 and determines a baseline probability (e.g., 50%) that the user belongs to the middle class based on the baseline information. The prediction module 280 retrieves information about the user from the user profile store 200, action log 220, or any other database accessible to the online system 100. The prediction module 280 inputs the information about the user to the socioeconomic group classifier 260. The prediction module 280 modifies the baseline probability based on probabilities output by the socioeconomic group classifier 260.

In an example use case, the socioeconomic group classifier 260 navigates through questions of the decision tree model 400 based on the input information about the user. The socioeconomic group classifier 260 starts with the top of the decision tree model 400, i.e., the question "what is the user's age?" A user profile—stored in the user profile store 200—of the user indicates that the user's age is 25 years, which falls within the range of "20-30 years old." Thus, the socioeconomic group classifier 260 navigates to the question "how many internet connected devices does the user own?"

The action log 220 indicates that the user interacts with the online system 100 using a laptop client device 110, a tablet client device 110, and a smartphone client device 110, i.e., the user likely owns three internet connected devices, which falls within the range "2+." Thus, the socioeconomic group classifier 260 navigates to the question "what is the user's highest education level?" The user profile indicates that the highest degree earned by the user is a Master's degree at the University of California, Los Angeles. Thus, the user's highest education level is a "graduate degree." Accordingly, the socioeconomic group classifier 260 outputs the probability "+15%." The prediction module 280 modifies a baseline probability, e.g., 50%, based on the output probability of +15%. As a result, the prediction module 280 determines that there is a 65% chance that the user belongs to the middle class. In some embodiments, the output probability is a negative probability, which indicates that it is less likely that the user belongs to a given socioeconomic group.

The decision tree model 400 is customized based on the types of questions. For instance, users who are 20-30 years old typically do not own houses yet, while users who are 30-40 years old typically own houses. Thus, the socioeconomic group classifier 260 navigates to a question about internet connected device ownership if the user is 20-30 years old, and navigates to a question about the location of the user's house if the user is 30-40 years old. By customizing the decision tree model 400, the socioeconomic group classifier 260 is more likely to use input information that is more relevant to the user, and thus output a probability that is a more accurate prediction of the user's socioeconomic group.

FIG. 5A is a graph of a first step function model 500 for predicting socioeconomic groups with training loss according to one embodiment. The machine learning module 250 generates one or more step function models (e.g., first step function model 500) based on training data or features from the training data store 270. The machine learning module 250 may use the step function models to generate decision tree models. For example, the step function models shown on the graphs illustrated in FIGS. 5A-C correspond to the question "how many internet connected devices does the user own?" in the decision tree model 400 shown in FIG. 4. The graphs shown in the FIGS. 5A-C, the x-axis of the graphs represent the number of devices (e.g., internet connected client devices 110) owned by a user of the online system 100. The y-axis of the graphs represents each socioeconomic group of a set of socioeconomic groups, e.g. working class, middle class, and upper class. The graph includes data points based on the training data or features, e.g., describing information about a population of users. For each number of devices on the x-axis, the machine learning module 250 plots a data point indicating the most common (e.g., statistical mode) socioeconomic group among users of the population who own the corresponding number of devices. In particular, users who own zero or one device typically belong to the working class, users who own two to five devices typically belong to the middle class, and users who own six devices typically belong to the upper class. The machine learning module 250 selects a resolution, in other words, a sampling rate of the data points, to generate the step function model. The resolution can be a constant interval, e.g., every other data point, or an arbitrary resolution, e.g., the first and fifth data point. Selecting a resolution that is too low may result in training loss, while selecting a resolution that is too high may result in additional complexity.

The machine learning module 250 selects a resolution corresponding to a constant sampling rate of five data points for the graph shown in FIG. 5A. Thus, the machine learning module 250 samples the first data point (e.g., zero devices) and the fifth data point (e.g., four devices) to generate the first step function model 500. The first step function model 500 indicates that users who own zero to three devices belong to the working class, and users who own four to six devices belong to the middle class. Thus, the first step function model 500 has training loss because the first step function model 500 loses information from the training data. In particular, users who own two to three devices belong to the middle class instead of the working class, and users who own six devices belong to the upper class instead of the middle class.

FIG. 5B is a graph of a second step function model 510 for predicting socioeconomic groups with high complexity according to one embodiment. The machine learning module 250 selects a resolution corresponding to a constant sampling rate of one data point for the graph shown in FIG. 5B. Thus, the machine learning module 250 samples each data point to generate the second step function model 510. The second step function model 510 indicates that users who own zero to one device belong to the working class, users who own two to five devices belong to the middle class, and users who own six devices belong to the upper class. Thus, unlike the first step function model 500, the second step function model 510 accurately represents the information from the training data. The second step function model 510 has high complexity because the sampling rate (e.g., resolution) is high, e.g., compared to the first step function model 500. A socioeconomic group classifier 260 requires more resources, e.g., computational processing power or time, to determine probabilities based on step function models with high resolutions.

FIG. 5C is a graph of a third step function model 520 for predicting socioeconomic groups according to one embodiment. The machine learning module 250 selects a resolution corresponding to a constant sampling rate of two data points for the graph shown in FIG. 5C. Thus, the machine learning module 250 samples the first data point (e.g., 0 devices), the third data point (e.g., two devices), the fifth data point (e.g., four devices), and the seventh data point (e.g., six devices) to generate the third step function model 520. The third step function model 520 indicates that users who own zero to one device belong to the working class, users who own two to five devices belong to the middle class, and users who own six devices belong to the upper class. Thus, similar to the second step function model 510, the third step function model 520 accurately represents the information from the training data. However, compared to the second step function model 510, the third step function model 520 has lower complexity because the resolution of the third step function model 520 is lower than the resolution of the second step function model 510.

III. Example Process Flow

FIG. 6 is a flowchart illustrating a process 600 for predicting socioeconomic groups according to one embodiment. In some embodiments, the process 600 is used by the online system 100—e.g., modules of the online system 100 described with reference to FIG. 2—within the system environment in FIG. 1. The process 600 may include different or additional steps than those described in conjunction with FIG. 6 in some embodiments or perform steps in different orders than the order described in conjunction with FIG. 6.

The prediction module 280 receives 610 user information about a target user of the online system 100. The user information can include information based on a user profile of the target user, e.g., from the user profile store 200, and based on actions performed by the target user on the online system 100 or a third party system 120, e.g., from the action log 220. The prediction module 280 retrieves 620 socioeconomic information describing a set of socioeconomic groups—e.g., from the training data store 270—such as working class, middle class, and upper class. The prediction module 280 retrieves 630 global information, e.g., from the training data store 270, describing a population of users of the online system 100 each associated with one of the socioeconomic groups. The online system 100 previously receives the socioeconomic information and global information (e.g., from a market research questionnaire or manually input by a user), and stores the received information in the training data store 270. The machine learning module 250 identifies 640 for each user of the population, features describing demographic data, goods (e.g., internet connected devices or household appliances) owned, and the user's socioeconomic group based on the global information. The machine learning module 250 trains 650 models used by classifiers, e.g., the one or more socioeconomic group classifiers 260, using the identified features. Each classifier is associated with a socioeconomic group and determines a probability that the target user belongs to the socioeconomic group. The prediction module 280 predicts 660 a socioeconomic group, e.g., from the set of socioeconomic groups, of the target user using the classifiers and the user information. For example, the prediction module 280 inputs the user information to the socioeconomic group classifiers 260. Each socioeconomic group classifier 260 determines a probability that the target user belong to a corresponding socioeconomic group, e.g., a socioeconomic group classifier 260 associated with the middle class determines a probability that the target user belong to the middle class.

In an example use case of the process 600, a third party system 120 provides sponsored content and a target socioeconomic group to the online system 100. In particular, the sponsored content describes a high-end smartphone product and the target socioeconomic group is the upper class, e.g., because users belonging to the upper class are more likely to purchase the high-end smartphone product. The prediction module 280 determines whether the predicted socioeconomic group of the target user matches the target socioeconomic group. If there is a match, the content generator 290 generates a content item including the sponsored content. The online system 100 provides the content item via the user interface manager 240 to for display on a client device 110 of the target user.

V. Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising: receiving user information about a target user of an online system, the user information describing a profile on the online system associated with the target user and describing interactions performed by the target user on the online system, the profile including a geographical region of the target user; retrieving socioeconomic information describing a plurality of socioeconomic groups; retrieving global information describing a plurality of users of the online system, each user associated with one of the socioeconomic groups; identifying, for each user of the plurality of users, features describing at least demographic data of the user, goods owned by the user, and a corresponding socioeconomic group of the user based on the global information; training a plurality of models using the identified features, the plurality of models used by a plurality of classifiers, each model trained with identified features specific to a geographical region, each classifier associated with a socioeconomic group of the plurality of socioeconomic groups and a geographical region; and predicting, from the plurality of socioeconomic groups for the geographical region of the target user, a predicted socioeconomic group of the target user using the plurality of classifiers and the user information.

2. The method of claim 1, wherein the features further describe internet usage of the user, an education level of the user, and a travel history of the user.

3. The method of claim 1, further comprising:
receiving a target socioeconomic group from a third party system outside of the online system;
receiving sponsored content from the third party system;
generating, in response to determining that the target socioeconomic group matches the predicted socioeconomic group of the target user, a content item based on the sponsored content; and
providing the content item to a client device of the user.

4. The method of claim 1, wherein the plurality of socioeconomic groups for the geographical region of the target user includes working class, middle class, and upper class.

5. The method of claim 1, wherein predicting the predicted socioeconomic group of the target user comprises:
determining, for each classifier of the plurality of classifiers associated with the geographical region of the user, a probability that the target user is associated with a socioeconomic group corresponding to the classifier; and
determining, in response to one of the probabilities being greater than a threshold confidence score, the predicted socioeconomic group of the target user.

6. The method of claim 5, wherein the threshold confidence score is adjustable based on the global information.

7. The method of claim 1, wherein the goods owned by the user describes internet connected client devices owned by the user or household appliances owned by the user.

8. The method of claim 1, further comprising:
receiving the socioeconomic information;
receiving the global information based on responses to a questionnaire; and
storing the socioeconomic information and the global information.

9. The method of claim 1, wherein the plurality of models include decision tree models, each decision tree model including a series of questions each corresponding to one of the identified features.

10. A computer program product comprising a non-transitory computer readable storage medium having instructions encoded thereon that, when executed by a processor, cause the processor to: receive user information about a target user of an online system, the user information describing a profile on the online system associated with the target user and describing interactions performed by the target user on the online system, the profile including a geographical region of the target user; retrieve socioeconomic information describing a plurality of socioeconomic groups; retrieve global information describing a plurality of users of the online system, each user associated with one of the socioeconomic groups; identify, for each user of the plurality of users, feature describing at least demographic data of the user, goods owned by the user, and a corresponding socioeconomic group of the user based on the global information; train a plurality of models using the identified features, the plurality of models used by a plurality of classifiers, each model trained with identified features specific to a geographical region, each classifier associated with a socioeconomic group of the plurality of socioeconomic groups and a geographical region; and predict, from the plurality of socioeconomic groups for the geographical region of the user, a predicted socioeconomic group of the target user using the plurality of classifiers and the user information.

11. The non-transitory computer readable storage medium of claim 10, wherein the features further describe internet usage of the user, an education level of the user, and a travel history of the user.

12. The non-transitory computer readable storage medium of claim 10, having further instructions that when executed by the processor cause the processor to:
receive a target socioeconomic group from a third party system outside of the online system;
receive sponsored content from the third party system;

generate, in response to determining that the target socioeconomic group matches the predicted socioeconomic group of the target user, a content item based on the sponsored content; and provide the content item to a client device of the user.

13. The non-transitory computer readable storage medium of claim 10, wherein the plurality of socioeconomic groups for the geographical region of the target user includes working class, middle class, and upper class.

14. The non-transitory computer readable storage medium of claim 10, wherein the instructions further cause the processor to:

determine, for each classifier of the plurality of classifiers associated with the geographical region of the user, a probability that the target user is associated with a socioeconomic group corresponding to the classifier; and determine, in response to one of the probabilities being greater than a threshold confidence score, the predicted socioeconomic group of the target user.

15. The non-transitory computer readable storage medium of claim 14, wherein the threshold confidence score is adjustable based on the global information.

16. The non-transitory computer readable storage medium of claim 10, wherein the goods owned by the user describes internet connected client devices owned by the user or household appliances owned by the user.

17. The non-transitory computer readable storage medium of claim 10, having further instructions that when executed by the processor cause the processor to:

receive the socioeconomic information;

receive the global information based on responses to a questionnaire; and store the socioeconomic information and the global information.

18. The non-transitory computer readable storage medium of claim 10, wherein the plurality of models include decision tree models, each decision tree model including a series of questions each corresponding to one of the identified features.

19. A method comprising: receiving user information about a target user of an online system, the user information describing a profile on the online system associated with the target user and describing interactions performed by the target user on the online system, the profile including a geographical region of the target user; retrieving socioeconomic information describing a plurality of socioeconomic groups; retrieving global information describing a plurality of users of the online system, each user associated with one of the socioeconomic groups, wherein the global information is categorized based on a geographical location of each user of the plurality of users; identifying, for each user of the plurality of users, features describing at least demographic data of the user, goods owned by the user, and a corresponding socioeconomic group of the user based on the global information; training a plurality of models using the identified features, the plurality of models used by a plurality of classifiers, each model trained with identified features specific to a geographical region, each classifier associated with a socioeconomic group of the plurality of socioeconomic groups and a geographical region; and predicting, from the plurality of socioeconomic groups for the geographical region of the target user, a predicted socioeconomic group of the target user using the plurality of classifiers and the user information.

* * * * *